United States Patent [19]
Serbin et al.

[11] Patent Number: 5,665,401
[45] Date of Patent: Sep. 9, 1997

[54] APPARATUS FOR PRODUCING AN OBJECT USING STEREOLITHOGRAPHY

[75] Inventors: Jürgen Serbin, Gräfelfing; Peter Wolff, Brunnthal; Gabriele Krug, München, all of Germany

[73] Assignee: EOS GmbH Electro Optical Systems, Planegg, Germany

[21] Appl. No.: 637,222

[22] Filed: Apr. 24, 1996

[30] Foreign Application Priority Data

Apr. 25, 1995 [DE] Germany .................. 195 15 165.8

[51] Int. Cl.⁶ .................. B29C 35/08; B29C 67/00
[52] U.S. Cl. .................. 425/174.4; 118/623; 118/100; 118/120
[58] Field of Search .................. 425/174.4, 174, 425/135; 118/623, 108, 120, 100; 264/405

[56] References Cited

U.S. PATENT DOCUMENTS

| | | | |
|---|---|---|---|
| 5,044,306 | 9/1991 | Erdmann | 118/120 |
| 5,174,931 | 12/1992 | Almquist et al. | 264/22 |
| 5,330,574 | 7/1994 | Nakagawa et al. | 118/120 |
| 5,358,673 | 10/1994 | Heller et al. | 264/22 |
| 5,573,721 | 11/1996 | Gillette | 118/120 |

FOREIGN PATENT DOCUMENTS

| | | | |
|---|---|---|---|
| 0171069A2 | 2/1986 | European Pat. Off. | G03C 9/08 |
| 0250121A2 | 12/1987 | European Pat. Off. | G09B 23/00 |
| 0 361 847 A2 | 4/1990 | European Pat. Off. | |
| 0 450 762 A1 | 3/1991 | European Pat. Off. | |
| 0 499 485 A2 | 8/1992 | European Pat. Off. | |
| 2 583 334 | 12/1986 | France | |
| 4134265C2 | 11/1993 | Germany | G03F 7/20 |
| 9400372 U | 5/1994 | Germany | B29C 39/42 |
| 9415849 U | 1/1995 | Germany | B29C 39/42 |
| 44 17 083 A1 | 11/1995 | Germany | |
| 2 262 817 | 6/1993 | United Kingdom | |
| WO91/12120 | 8/1991 | WIPO | B29C 35/08 |
| WO96/12608 | 5/1996 | WIPO | |

*Primary Examiner*—Khanh P. Nguyen
*Attorney, Agent, or Firm*—George W. Neuner

[57] ABSTRACT

An apparatus for producing an object using stereolithography includes a container, a bath of a liquid or powder material filling the container and having a free surface, the material being solidifiable under the action of electromagnetic radiation, a support for positioning the object relative to the free surface of the bath so as to form a layer of the material adjacent to the free surface, a device for solidifying the layer using electromagnetic radiation, a wiper device extending along a first direction across the free surface and drive means for moving the wiper device across the free surface along a second direction. In order to achieve optimum wiping conditions the wiper device has a leading first surface portion and a trailing second surface portion when moving along the second direction, the first and second surface portions extending in the first direction, the first surface portion having a first surface tension value and the second surface portion having a second surface tension value different from the first surface tension value.

6 Claims, 6 Drawing Sheets

FIG.9B before
CV−   Irradiation
after

FIG.9C before
CV+   Irradiation
after

FIG.10

APPARATUS FOR PRODUCING AN OBJECT USING STEREOLITHOGRAPHY

BACKGROUND OF THE INVENTION

The invention relates to an apparatus for producing an object using stereolithography, whereby layers of a liquid or powder material are formed and successively solidified.

A conventional stereolithographic apparatus is known from the German patent 41 34 265. This known apparatus comprises a wiper which may be provided with an antiadhesive coating or may be formed of a material having low adhesive properties. When using a wiper having low adhesion forces the contact between the wiper and the liquid material during wiping may locally be separated. This may cause the so-called "dewetting". On the other hand, if the wiper is formed of a material having a high surface tension, experience has shown that ununiform coatings occur because the material raises at the rear side of the wiper moving in wiping direction.

The DE 94 15 849 U1 discloses a stereolithographic apparatus with a wiper having at least two wiper members.

Various coating methods are used in stereolithography. According to EP 0 171 069 a liquid layer of the light curing resin is applied by lowering the object within a bath by an extent exceeding the desired layer thickness and subsequent raising the object to a level below the bath surface corresponding to the intended layer thickness. It is further known to apply the material for the layer from above using a material supply in EP 0 250 121 or a spray tube in WO 91/12120. The mentioned coating method do not yet provide an optimum speed of adjusting a desired layer thickness.

Coating methods using a wiper are known for accelerating the adjustment of the layer thickness. In the simplest case described in German patent 41 34 265 the support carrying the object to be formed is lowered by an extent corresponding to the desired layer thickness in a bath of light-curable liquid material, whereby unsolidified material flows onto the previously cured layer from the edges thereof. To accelerate the adjustment of the desired layer thickness the wiper strikes the material across the previously solidified layer. The coating process may also be accelerated by lowering the support in the bath by an extent exceeding the intended layer thickness, followed by striking with a wiper. However, it is the drawback of these methods that the produced layer thickness is considerably greater than the desired layer thickness. A solution to this problem known to the applicant consists in collecting the amount of resin which was displaced in the bath by lowering the support and continuously applying the same directly upstream of the wiper during the wiping process using a continuously operating low pressure pump, whereby a quasi continuous coating is obtained. A further known variation of a coating process is the so-called coating channel method wherein the amount of resin displaced by lowering the support is pumped in a single discrete pumping operation into a coating channel provided upstream of the wiper in wiping or stripping direction and delivered therefrom to a location directly upstream of the wiper through an outlet of the coating channel. The resin supply from the coating channel across the surface to be coated is an exponential function of the instantaneous resin level in the coating channel, i.e. the lower the resin level in the coating channel the less is supplied. Thus, the layer thickness decreases with the coating distance.

A general problem consisting in the use of conventional wipers is the interaction of the wiper with the used resin which may cause the above-mentioned "dewetting".

Figure 8:
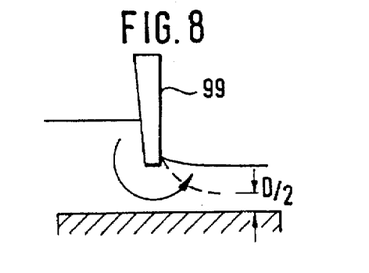
FIG. 8 is a schematical representation of a problem occuring when using a conventional wiper.
Figure 9A:
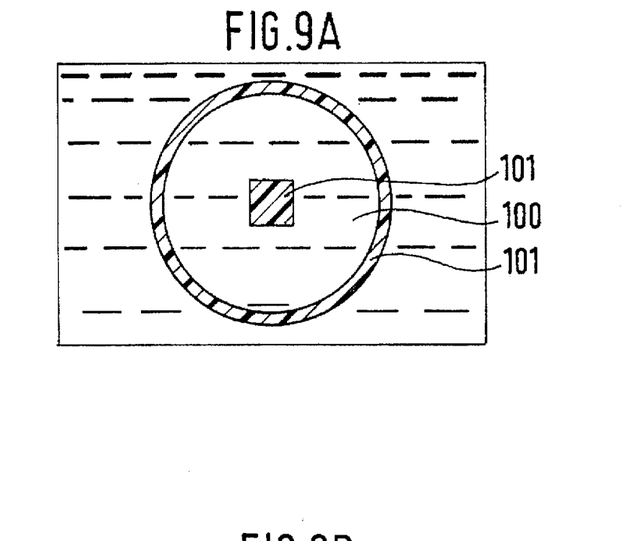
FIGS. 9a–9c show problems occuring when using conventional wipers in the presence of "closed volumes" in a schematic manner.
Figure 9B:
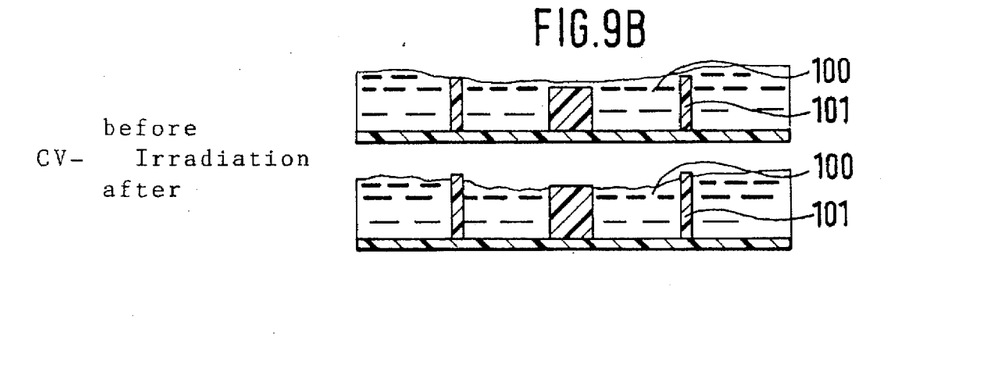

A further problem is shown in FIGS. 8 and 9. Within "closed volumes" 100, i.e. regions of liquid resin surrounded by solidified resin 101, the resin flowing around the wiper 99 causes the bath level to raise which results in dimensional divergences of the object, in particular of the object within the "closed volume" (CV+, CV-effects). A further disadvantageous effect of the known coating process using a wiper is a nose 102 which is shown in FIG. 10 and produced at the borderline between the previously solidified layer and the unsolidified resin. The flow of the resin around the wiper may also produce concave or convex surfaces which causes a reduced accuracy of the object.

OBJECTS OF THE INVENTION

It is an object of the invention to provide an improved stereolithographic apparatus. It is a further object of the invention to provide a stereolithographic apparatus improving the accuracy of the object. It is still further object of the invention to provide a stereolithographic apparatus which facilitates the adjustment of the layer thickness.

SUMMARY OF THE INVENTION

In order to achieve the above-mentioned objects the invention provides an apparatus for producing an object using stereolithography, the apparatus comprising a container, a bath of a liquid or powder material filling the container and having a free surface, the material being solidifiable under the action of electromagnetic radiation, a support for positioning the object relative to the free surface of the bath so as to form a layer of the material adjacent to the free surface, a device for solidifying the layer using electromagnetic radiation, a wiper device extending along a first direction across the free surface, drive means for moving the wiper device across the free surface along a second direction, the wiper device having a leading first surface portion and a trailing second surface portion when moving along the second direction, the first and second surface portions extending in the first direction, the first surface portion having a first surface tension value and the second surface portion having a second surface tension value different from the first surface tension value.

BRIEF DESCRIPTION OF THE DRAWINGS

Further advantages, features and objects of the invention will be apparent from the following description of exemplary embodiments with reference to the drawings, wherein.

DESCRIPTION OF PREFERRED EMBODIMENTS

The apparatus will be explained with reference to the FIG. 1 to FIG. 7.

Figure 1:
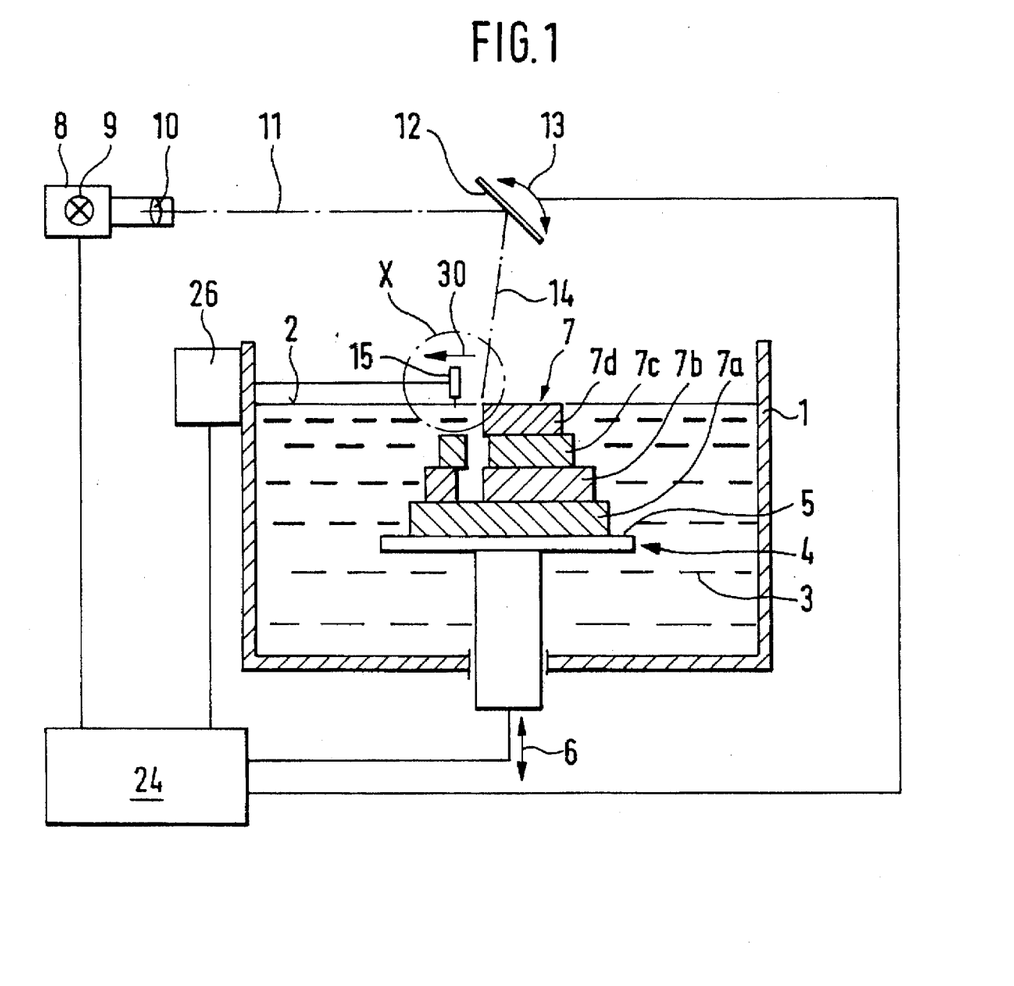
FIG. 1 is a schematical representation of a first embodiment of the inventive apparatus.

A container 1 having an open top is filled with a light-curable liquid resin material 3, for example a UV-curable resin, up to a level or surface 2. A support 4 is provided within the container 1 and within the volume of the resin 3 and has a substantially plane and horizontal support plate 5 which is parallel to the surface 2 and may be displaced and positioned up and down in a direction perpendicular to the surface 2 or to the support plate 5 by means of a schematically indicated displacement or level adjustment device 6.

The object 7 is built up on the support plate 5 in the form of a plurality of layers 7a, 7b, 7c and 7d each extending parallel to the surface 2 and to the support plate 5, in the manner described further below.

A device 8 for solidifying the uppermost layer 7d adjacent to the surface comprises an irradiation device 9 with a light source producing a focussed light beam 11 by means of a lens system 10. A deflection mirror 12 is suspended on gimbals about centrally above the container 1 and can be pivoted by a schematically indicated pivoting device 13 so that the reflected light beam 14 formed by reflecting the light beam 11 striking the mirror 12 can be directed to substantially any point of the surface 2. Alternatively, two rotating mirrors, one for each coordinate, may be used in conventional manner.

A wiper 15 shown in FIG. 1 in schematic manner is arranged at the open top of the container 1. The wiper 15 extends substantially across the open top of the container 1 and is coupled with a displacement device 26 for moving the wiper 15 in a horizontal plane across the surface 2 in a direction 30 substantially perpendicular to the extension of the wiper 15.

The displacement device 26 is adapted to move the wiper 15 with an adjustable, variable speed.

A processor 24 is coupled with the irradiation device 9, the pivoting device 13 and the displacement device 26 for carrying out the known stereolithographic process.

Figure 2:
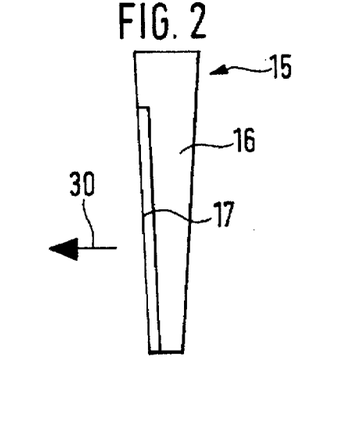
FIG. 2 shows a first embodiment of the wiper.
Figure 3:
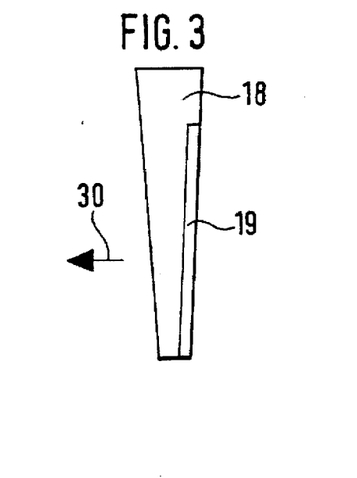
FIG. 3 shows a second embodiment of the wiper.
Figure 4:
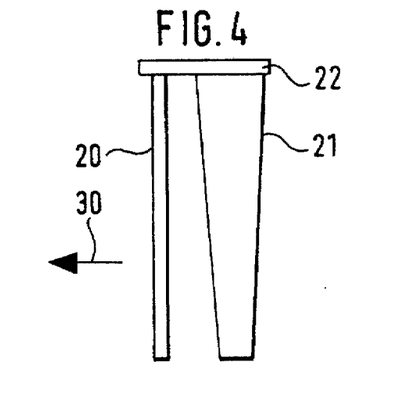
FIG. 4 shows a further modified embodiment of the wiper.

The FIGS. 2 to 4 show embodiments of wipers wherein the displacement direction during the proper wiping process is indicated by a corresponding arrow 30.

The outer shape and dimensions of the wiper 15 are determined in usual manner. In the first embodiment shown in FIG. 2 the wiper comprises a body 16 made of a first material. A material layer coming into contact with the material 3 to be wiped or smoothed is applied to the front surface of the body which is the leading surface when moving the wiper in a displacement direction indicated by the arrow 30. The material layer forms a first surface portion 17 and may be applied to the body for example by bonding. In the shown embodiment the body has a corresponding recess receiving the coating material which forms the first surface portion and which is fitted therein for example by using adhesive. In the first embodiment the base 16 consists of a material made of VITON which is a copolymer of vinylidene fluoride and hexafluoroproylene or polytetrafluoroethylene (PTFE) or a material having a similarly low surface tension value. The leading front side is coated with aluminium or steel or a material having a similarly high surface tension value.

The modified embodiment shown in FIG. 3 differs from the previous one in that the base 18 is formed of a material such as aluminium or steel or a material having a similarly high surface tension value. The base has a surface portion 19 coated with a material such as viton or PTFE or a material having a similarly low surface tension value. The coating may be made by bonding to the surface. In the shown embodiments the base 18 has a recess on its back receiving a layer of VITON or PTFE for forming the second surface region 19.

In the embodiment shown in FIG. 4 the wiper consists of, seen from the displacement direction indicated by arrow 30, a pre-wiper 20 and the wiper member proper 21. Both wipers are connected at their upper side through a common bracket 22 which serves to mount the wiper in a mounting of the device coupled with the driving device 26. The leading pre-wiper 20 in advance direction of the wiper is made of aluminium or steel or a material having a similarly high surface tension value. The following wiper member 21 is made of a material such as VITON or PTFE or a material having a similarly low surface tension value.

In operation the relatively high surface tension at the leading front side prevents the resin film from being separated from the wiper. Simultaneously, the low surface tension value at the back of the wiper prevents building up of excessive material.

Figure 5:
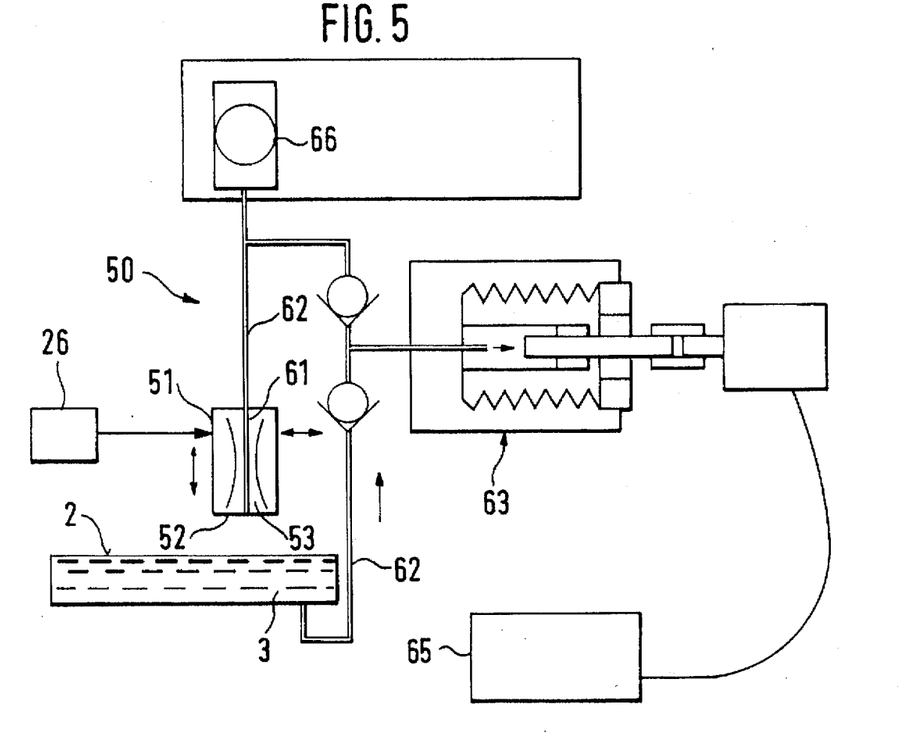
FIG. 5 is a schematic partial view of a second embodiment of the inventive apparatus.
Figure 6:
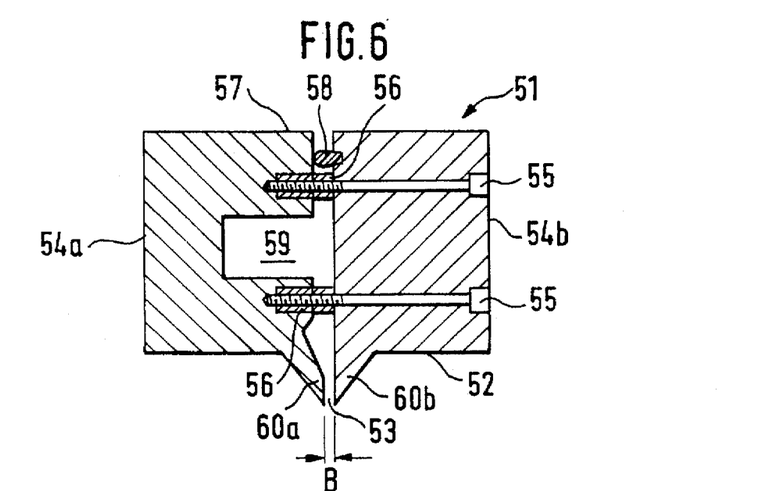
FIG. 6 is a sectional view of the metering device of FIG. 5.

A further embodiment of the apparatus shown in the FIGS. 5 to 7 comprises, in addition to or in place of the wiper 15 of FIGS. 1 to 4, a coating device 50 which is adapted to exactely meter the applied amount or volume, respectively, of the resin so as to obtain the desired layer thickness without requiring the wiper for adjusting the layer thickness.

The coating device 50 comprises a metering device 51 disposed above the surface 2 of the bath and extending across the working surface or bath surface 2, respectively. A slit 53 extends across the entire bottom surface 52 of the metering device 51 facing the bath surface 2. As shown in FIG. 6 the metering device 51 comprises two parts or jaws 54a and 54b each having a substantially rectangular cross-section in a plane perpendicular to the bath surface 2. The jaws 54a and 54b are screwed together through bolts 55 and spacers 56 so that their facing surfaces form the slit 53 of the metering device 51. The upper side of the slit 53 opposite to the bath surface 2 and to the bottom surface 52 is sealed by means of a flexible gasket 58 consisting for example of rubber or silicone and being disposed between the parts 54a and 54b. A channel-shaped recess 59 is formed in a side of one of the jaws 54a facing the other jaw 54b and extends across the entire width of the bath surface 2. The recess 59 serves to receive a defined amount of resin supplied through an inlet not shown in FIG. 6 so that a small resin inventory is always retained within the channel-shaped recess 59. That end of the channel-shaped receeess 59 which does not communicate with the inlet is closed, whereby resin may leave the recess only through the slit 53. The bottom surfaces 52 of the jaws 54a and 54b facing the bath surface 2 are each provided, at their adjacent sides, with respective projections 60a and 60b having an approximately triangular cross-section and each extending across the entire width of the bath surface 2. The projections 60a, 60b cooperate with the slit 53 therebetween to form a kind of nozzle for discharging the resin. The width B of the slit, i.e. the distance between the two jaws 54a, 54b, can be adjusted by suitably selecting the spacers 56. Generally, the width B corresponds to about one layer thickness, i.e. several tenth of millimeters. The elevation of the metering device 51 with respect to the bath surface 2 can be adjusted by means of a not shown elevation adjustment device. In the described embodiment the elevation is adjusted to locate the discharge opening of the nozzle 60a, 60b immediately above the bath surface 2 without, however, being in contact therewith.

In this embodiment there is an additional (not shown) wiper mounted at that side of the metering device 51 which is on the trailing side of the slit 53 in moving direction for applying the material. The wiper serves to smooth the material discharged from the slit 53.

The metering device is connected with the mentioned displacement device 56 which is controlled to displace the metering device 51 parallel to the bath surface 2 with an adjustable, variable speed w.

As shown in particular in FIG. 5 an inlet 61 of the slit 53 of the metering device 51 communicates with the resin bath 3 in the container 1 through a conduit 52, whereby a non-leaking continuously operating pump 63 is coupled between the bath and the metering device 51. The pump 63 delivers the resin 3 from the container 1 through the conduit 52 into the metering device 51.

The pump 63 is preferably formed as a bellows pump having a high stroke volume. The stroke volume of the pump 63 has a value which is high enough so that a single stroke only is required for one coating process. In this embodiment the discharge pressure of the pump 63 is about 1 bar. The pump 63 is controlled through a control unit 65 to deliver the resin 3 with a constant, preadjusted volume flow irrespective of the counter pressure caused i.e. by varying viscosity of the resin.

Further, the control unit 65 is designed to allow a control of the discharge volume flow of the resin 3 along the entire displacement of the metering device 51, whereby the amount of resin 3 discharged through the slit 53 can be metered. The control unit 65 of the pump is coupled with the central control 24 so that the drive of the pump 63 can be controlled by a processor in the central control device. Thus, the resin volume flow discharged through the slit 53 can be controlled according to the respective desired layer thickness.

In an embodiment shown in FIG. 7 the projection 60a, 60b of the metering device 51 is located in a distance D of for example 3 to 5 millimetres above the bath surface 2 rather than directly thereabove. In this case the pump 63 is continuously operated with a small stroke volume, i.e. several strokes are required for appyling each layer. The pump 63 has a high discharge pressure of up to 5 bar. To establish continuous delivery pressure the pump 63 is connected with a pressurized tank 66 which provides gas volume in the conduit 62 for maintaining a constant high value of the delivery pressure.

When working with such high pressures it is preferred to dispense with moving resin-carrying conduits in order to safely prevent uncontrolled discharge of resin. In this case the pump 63 is carried along with the metering device. Moreover, a measuring device for sensing the surface level of the applied layer or of the surface of a reference component may be provided. The reference component may for example be a cube which is simultaneously built up at the border of the working area. The measuring device determines the thickness of the layers to be applied.

In operation the following steps are carried out for each layer of the object to be solidified using the coating device 50 shown in FIG. 5.

Before starting the building process the slit width B is adjusted to the size of the desired layer thickness by selecting suitable spacers. This adjustment also depends on the viscosity of the resin used.

In a first step the support 4 in the container 1 is lowered by an amount corresponding to the desired layer thickness using the elevation adjustment device 6.

Thereupon, the pump 63 delivers a defined amount of resin 3 from the container 1, whereby the stroke-volume of the delivery pump is adjusted so that the delivered amount is sufficient for applying a fresh layer. Thereafter, the displacement device 26 is controlled to move the metering device across the bath surface 2, whereby the resin flowing into the slit 53 through the conduit 62 is applied onto the surface of the previously solidified layer through the slit or the nozzle 60a, 60b, respectively, of the metering device 51. The wiper 15 mounted in moving direction behind the metering device 51 smoothes the applied resin layer 3. A uniform distribution of the applied material in moving direction of the metering device is achieved by matching the delivery volume flow and the moving speed w of the metering device. To avoid defects in the object the coating volume may be varied during the displacement of the metering device. It is for example possible to position objects within the working area so that they can be coated with different resin amounts.

Figure 9C:
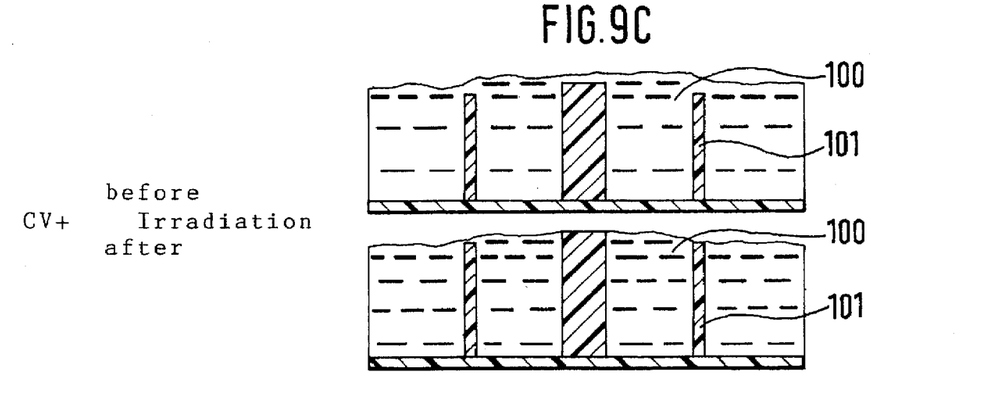
Figure 10:
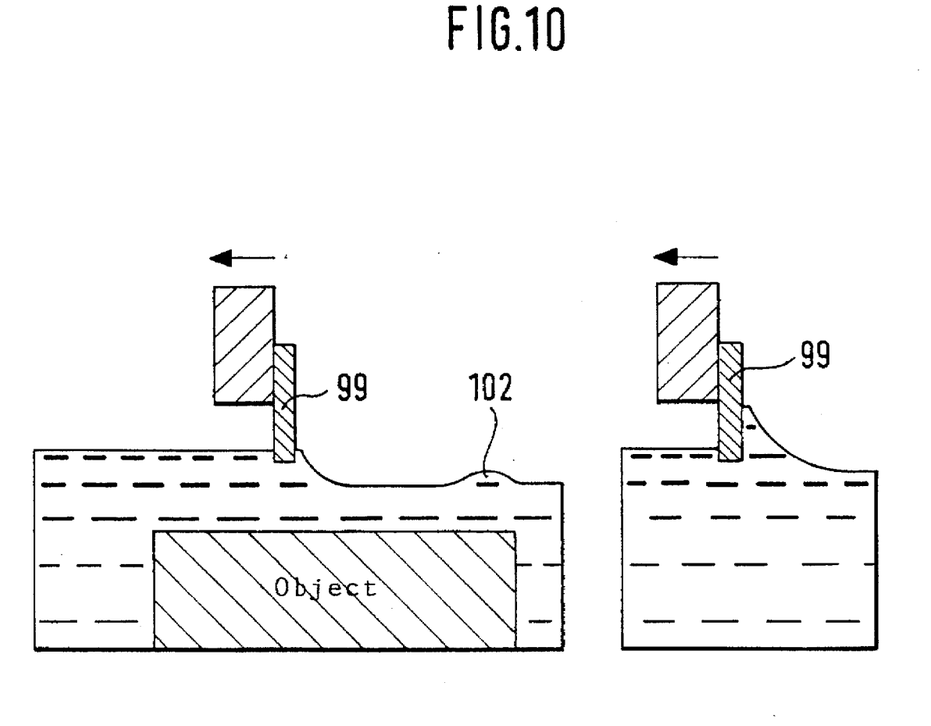
FIG. 10 is a schematic view of a further problem occuring when using a conventional wiper.

In order to avoid the CV+ effect shown in FIG. 9c it is preferred to adjust the stroke volume of the pump 63 to a value corresponding to 1.8 times the layer volume.

After applying one layer the same is solidified at points corresponding to the object using the laser beam 17. This is made by controlling the pivoting device 13 to direct the deflected light beam 14 to the desired places of the layer to cure the resin 3 thereat.

The described steps are repeated until the object 7 is finished.

Figure 7A:
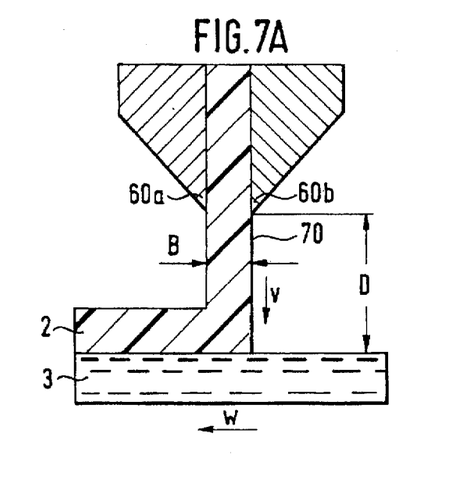
FIGS. 7a–7b are sectional views of the coating process of an embodiment of the invention in schematic manner.
Figure 7B:
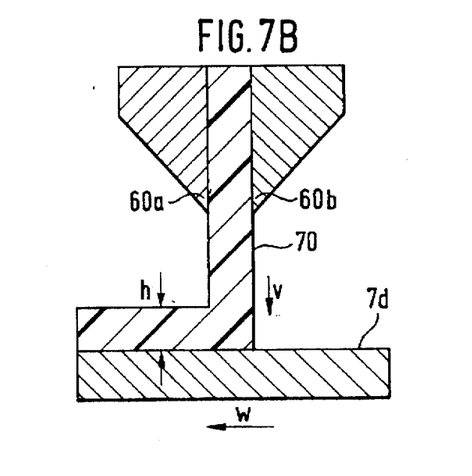

According to a further embodiment of the method shown in FIGS. 7a and 7b the elevation of the metering device 51 is initially set so that the nozzle 60a, 60b is in a distance D of for example 3–5 mm above the bath surface 2.

As in the above-described embodiment a first step is to lower the support 4 in the container 1 by an amount corresponding to the desired layer thickness. The pump 63 is operated with a high delivery pressure of up to 5 bar. To this end the control unit 65 sets the stroke volume to a value smaller than the corresponding layer volume, whereby the pump 63 makes a number of strokes or pumps continuously during a single coating process. The accumulator 66 ensures constant pressure of the resin 3 in the inlet 61 of the slit 53. As a result of the high delivery pressure the discharge speed v of the resin 3 in the slit 53 has a value sufficient to produce a film or curtain 70 discharged from the bottom side of the nozzle 60a, 60b, as shown in FIGS. 7a and 7b, and applied to the previously solidified layer or to unsolidilied regions of the previous layer, respectively. The displacement speed v of the metering device 51 and the delivery pressure of the pump 63 are adjusted so that the resin discharged from the nozzle 60a, 60b forms a film 70 having a thickness corresponding to the desired layer thickness h and this film is applied to the solidified regions of the previous layer (FIG. 7b) or to the unsolidified regions of the previous layer (FIG. 7a). In this case there is no interaction between the resin 3 at the bath surface 2 and the material discharging from the nozzle 60a, 60b so that disadvantageous effects such as the CV− or CV+ effects shown in FIGS. 9b and 9c or the nose shown in FIG. 10 are avoided.

Subsequently the layer is solidified at places corresponding to the object in the same manner as in the previous embodiment.

The above-described coating processes and the corresponding apparatus are advantageous in that, on the one hand, the mentioned negative effects can be prevented and, on the other hand the layer thickness can be easily adjusted and varied. The adjustment of the layer thickness is made by varying the width of the slit, the displacement speed of the metering device and the delivery volume of the pump. A high delivery pressure and corresponding high pressure drop in the narrow slit eliminate the gravity effect on the amount discharged from the slit and therefore increase the precision of the layer thickness. Moreover, the layer thickness can easily be adapted to the characteristics of the object or component by varying the delivery volume of the pump from layer to layer and/or during the application of a layer.

Although the invention has been described with reference to specific example embodiments it is to be understood that it is intended to cover all modifications and equivalents within the spirit and scope of the appended claims.

We claim:

1. Apparatus for producing an object using stereolithography, said apparatus comprising:

a container, a bath of a liquid or powder material filling said container and having a free surface, said material being solidifiable under the action of electromagnetic radiation, a support for positioning said object relative to said free surface of said bath so as to form a layer of said material adjacent to said free surface, a device for solidifying said layer using electromagnetic radiation, a wiper device extending along a first direction across said free surface, drive means for moving said wiper device across said free surface along a second direction, said wiper device having a leading first surface portion and a trailing second surface portion when moving along said second direction, said first and second surface portions extending in said first direction, said first surface portion having a first surface tension value and said second surface portion having a second surface tension value different from said first surface tension value.

2. The apparatus of claim 1, wherein said first surface tension value of said leading first surface portion is greater than said second surface tension value of said trailing second surface portion.

3. The apparatus of claim 1, wherein the material forming said first surface portion is steel or aluminium and the material forming said second surface portion is a plastic material comprising a polytetrafluoroethylene.

4. The apparatus of claim 1, wherein said wiper device comprises at least two wiper members, one of the wiper members being a pre-wiper disposed in leading position during movement of said drive means in said second direction and having a leading front side provided with said first surface tension value, the other of said wiper members being a trailing wiper during movement of said wiper device along said second direction and having a back opposite to said front side, said back being provided with said second surface tension value.

5. The apparatus of claim 1, wherein said wiper device comprises a body having at least one of said surface portions applied thereto by bonding said at least one surface portion to said body.

6. The apparatus of claim 1, wherein the material forming said first surface portion is steel or aluminum and the material forming said second surface portion is a plastic material comprising a copolymer of vinylidene fluoride and hexafluoropropylene.

* * * * *